United States Patent [19]

Kanada et al.

[11] Patent Number: 4,787,569
[45] Date of Patent: Nov. 29, 1988

[54] WEBBING RETRACTOR

[75] Inventors: Shigeyasu Kanada; Yoshio Nakano, both of Aichi, Japan

[73] Assignee: Kabushiki Kaisha Tokai-Rika-Denki-Seisakusho, Aichi, Japan

[21] Appl. No.: 921,135

[22] Filed: Oct. 21, 1986

[30] Foreign Application Priority Data

Oct. 22, 1985 [JP] Japan ............................ 60-161833[U]

[51] Int. Cl.⁴ .............................................. A62B 35/00
[52] U.S. Cl. ..................................... 242/107; 280/807
[58] Field of Search ......... 242/107, 107.4 D, 107.4 R, 242/107.4 A, 107.4 B, 107.4 C, 107.6, 107.7; 280/806, 807, 801; 297/468, 474–480

[56] References Cited

U.S. PATENT DOCUMENTS

| | | | |
|---|---|---|---|
| 4,120,467 | 10/1978 | Stephenson | 242/107 |
| 4,345,723 | 8/1982 | Moringga | 242/107.4 R X |
| 4,478,433 | 10/1984 | Taguchi et al. | 242/107 X |
| 4,669,680 | 6/1987 | Nishimura et al. | 242/107 |

FOREIGN PATENT DOCUMENTS 75129   5/1983  Japan .
59-150083  10/1984  Japan .

Primary Examiner—David Werner
Attorney, Agent, or Firm—Sixbey, Friedman, Leedom & Ferguson

[57] ABSTRACT

A webbing retractor for a vehicle includes a webbing take-up shaft which winds up an occupant restraining webbing with a relatively weak biasing force from a spiral spring, thus reducing the pressure applied to the body of an occupant from the webbing. When the occupant unfastens the webbing and a predetermined amount of webbing is rewound on the take-up shaft, a controller activates a motor to rotate the take-up shaft so as to rewind the whole of the unwound webbing with a relatively strong driving force.

19 Claims, 9 Drawing Sheets

WEBBING RETRACTOR

BACKGROUND OF THE INVENTION

1. Field of the Invention

The present invention relates to a webbing retractor and, more particularly, to a webbing retractor which is arranged such as to reduce the pressure applied to the body of an occupant from a webbing when he has the webbing fastened.

2. Description of the Related Art

In seatbelt systems, a webbing is generally wound up onto a take-up shaft by rotating the shaft by means of biasing force from a spiral spring. The biasing force of the spiral spring is set so as to be relatively large, since it is necessary to fully rewind the webbing onto the take-up shaft after the occupant has unfastened the webbing. Accordingly, there has been the problem that the occupant may experience discomfort from the pressure of the webbing when he moves in the seat whilst driving with the webbing fastened.

To solve such problem, one type of webbing retractor has already been proposed wherein, when the occupant has the webbing fastened, the outer end of the spiral spring is wound up by the use of a motor in order to adjust the biasing force from the spiral spring, thereby allowing the webbing wind-up force to be adjusted to the optimum (see the specification of Japanese Utility Model No. 75129/1983).

However, the above-described type of conventional webbing retractor, which enables adjustment of the webbing wind-up force, suffers from the following problems. Namely, this conventional webbing retractor needs a webbing tension detector in order to adjust the webbing tension in accordance with the condition of the webbing, which changes depending on whether, for example, the occupant has the webbing fastened or not. In consequence, the structure and control of this type of conventional webbing retractor are complicated, disadvantageously.

In order to overcome the above-described disadvantages, the applicant of this invention has already proposed a webbing retractor (Japanese Utility Model No. 150083/1984) which has a simplified structure and involves a facilitated control operation. This improved webbing retractor is provided with a buckle switch which turns on when a tongue plate which is attached to one end of the webbing is engaged with a buckle device, so that, immediately after the buckle switch has turned off, the take-up shaft is activated by a motor so as to rotate in the direction in which the webbing is wound up.

However, the above-described webbing retractor, proposed by the present applicant, involves the following problems. Since the webbing is wound up by the operation of the motor immediately after the buckle switch has turned off, that is, immediately after the occupant has unfastened the webbing, the webbing is suddenly rewound by means of a relatively strong driving force from the motor which is abruptly applied to the webbing immediately after the webbing has been unfastened, and this may discomfort or shock the occupant.

SUMMARY OF THE INVENTION

In view of the above circumstances, it is a primary object of the present invention to provide a webbing retractor so designed that it is possible to reduce the pressure applied to the body of an occupant from the webbing when he has the webbing fastened, and further to prevent the webbing from causing the occupant to be discomforted or shocked when the webbing is rewound after it has been unfastened from the occupant's body.

To this end, the present invention provides a webbing retractor for use in a seatbelt system for a vehicle designed to protect an occupant in an emergency situation of the vehicle, comprising: a take-up shaft for winding up a webbing; biasing means for relatively weakly biasing the take-up shaft in a direction in which the webbing is wound up; driving means for activating the take-up shaft to rotate in the webbing wind-up direction; means for detecting whether or not a predetermined amount of the webbing unfastened from the occupant's body has been wound up on the take-up shaft; and control means adapted to activate the driving means when the detecting means detects the fact that a predetermined amount of the webbing has been wound up on the take-up shaft.

According to the present invention, when the occupant has the webbing fastened, the webbing is subjected to the biasing force from the biasing means which biases the take-up shaft with a relatively weak force in the webbing wind-up direction. Therefore, the pressure applied to the occupant's body from the webbing is reduced advantageously. The force of the biasing means is set at such a level that the tension which is applied to the webbing is sufficiently weak and yet there is no unnecessary slack in the webbing. When the occupant unfastens the webbing, the webbing is started to be rewound on the take-up shaft by means of the biasing force from the biasing means. However, since this biasing force is relatively weak, the webbing is not fully wound up onto the take-up shaft. When a predetermined amount of webbing has been wound up on the take-up shaft by means of the biasing force from the biasing means, this is detected by the detecting means. In consequence, the driving means is activated to cause the webbing to be wound up by means of the driving force from the driving means. When the webbing is wound up by this driving force, the webbing is sufficiently spaced apart from the occupant's body. There is therefore no fear of the webbing causing the occupant to be discomforted or shocked.

As described above, it is advantageously possible, according to the present invention, to eliminate the fear of the webbing causing the occupant to be discomforted or shocked when the webbing is wound up after the occupant has unfastened the webbing.

DESCRIPTION OF THE PREFERRED EMBODIMENT

One preferred embodiment of the present invention will be described hereinunder in detail with reference to the accompanying drawings.

Figure 1:
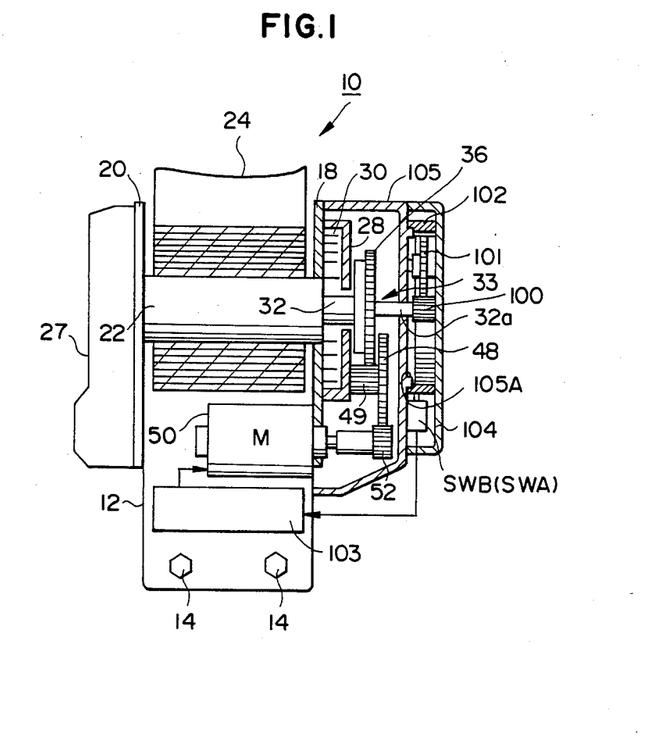
FIG. 1 is a sectional view of one embodiment of the webbing retractor according to the present invention.

FIG. 1 shows a webbing retractor 10 in accordance with one embodiment of the present invention. In this retractor 10, a frame 12 is rigidly secured to a vehicle body by means of mounting bolts 14.

A pair of parallel leg plates 18 and 20 extend from the both sides, respectively, of the frame 12. Two longitudinal end portions of a take-up shaft 22 are rotatably supported by the leg plates 18 and 20, respectively. One end of an occupant restraining webbing 24 is retained by the central portion of the take-shaft 22, and the webbing 24 is wound up in layers on the shaft 22.

A tongue plate (not shown) is retained at the other end of the webbing 24, the tongue plate being engageable with a buckle device (not shown). The buckle device is secured to another portion of the vehicle body. The intermediate portion of the webbing 24 is used to fasten the body of an occupant.

An inertia type lock mechanism 27 is provided outside the leg plate 20 in such a manner as to be interposed between the take-up shaft 22 and the leg plate 20. The lock mechanism 27 has a structure which is generally employed. More specifically, when an emergency situation of the vehicle occurs, the lock mechanism 27 senses a predetermined degree of acceleration acting on the vehicle body or a predetermined degree of acceleration acting on the webbing 24 being unwound, and abruptly stops the rotation of the take-up shaft 22 in the direction in which the webbing 24 is unwound.

Figure 2:
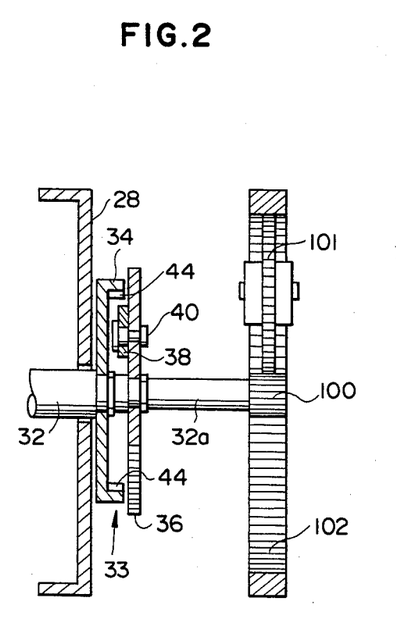
FIGS. 2 and 3 are enlarged views of the centrifugal clutch section shown in FIG. 1.
Figure 3:
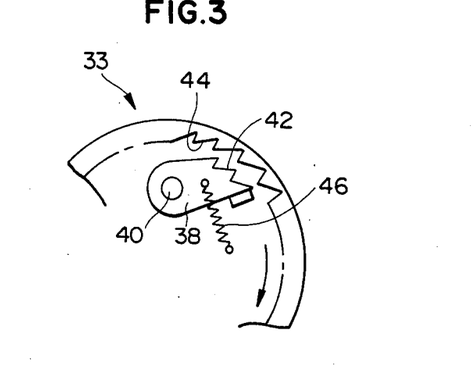

A spring casing 28 is rigidly secured to the leg plate 18, and the outer end of a spiral spring 30 having a relatively weak biasing force is retained by the inner peripheral surface of the spring casing 28. The biasing force of the spiral spring 30 is set at such a level that the occupant who has the webbing 24 fastened feels no pressure from the webbing 24 and yet the webbing 24 is tensed sufficiently so that there is no slack in the webbing 24. The inner end of the spiral spring 30 is retained by a driven shaft 32 which is defined by the end portion of the take-up shaft 22 which extends through the leg plate 18 so as to project therefrom. The outer end portion of the driven shaft 32 extends through the spring casing 28, and the projecting distal end portion of the driven shaft 32 defines a shaft 32a. A centrifugal clutch 33 is provided on the intermediate portion of the driven shaft 32, as shown in FIG. 2. An internally-toothed ratchet wheel 34 which constitutes a part of the centrifugal clutch 33 is rigidly fitted on the driven shaft 32 so that the ratchet wheel 34 rotates together with the take-up shaft 22 in one unit. A spur gear 36 is rotatably supported on the intermediate portion of the driven shaft 32. As shown in FIG. 3, a lock piece 38 is pivotally supported through a pin 40 on the end face of the spur gear 36 which is closer to the ratchet wheel 34. Lock teeth 42 are provided on the distal end portion of the lock piece 38 so that when the lock piece 38 pivots about the pin 40 in the counterclockwise direction as viewed in FIG. 3, the lock teeth 42 are meshed with ratchet teeth 44 provided on the internally-toothed ratchet wheel 34, thus bringing the centrifual clutch 33 into an engaged state. The intermediate portion of the lock piece 38 is connected to the end face of the spur gear 36 by a coil spring 46. Accordingly, the lock teeth 42 are normally separated from the ratchet teeth 44; hence, the centrifugal clutch 33 is in a disengaged state.

As shown in FIG. 1, a pinion 49 which is formed integral with a reduction spur gear 48 is rotatably supported on the end face of the spring casing 28. The pinion 49 is meshed with the gear 36. The reduction spur gear 48 is meshed with a spur gear shaft 52 which is rigidly secured to the rotating shaft of a motor 50 which is secured to the frame 12.

A lower casing 105 is secured to the leg plate 18 in such a manner as to surround the clutch 33 and the like. The distal end portion of the shaft 32a, which is defined by the distal end portion of the driven shaft 32, extends through the lower casing 105 so as to project therefrom, and a pinion 100 is rigidly secured to the projecting end portion of the shaft 32a, as shown in FIGS. 1 and 2. Accordingly, the take-up shaft 22, the driven shaft 32 and the pinion 100 are rotatable together in one unit. A ring-shaped projection 105a is formed on the outer surface of the lower casing 105 in such a manner that the projection 105a is concentric with the pinion 100. An internally-toothed gear 102 is engaged with the projection 105a. The gear 102 is rotatably supported by both the projection 105a and an upper casing 104. An idle gear 101 which is rotatably supported by both the lower and upper casings 105 and 104 is interposed between the internally-toothed gear 102 and the pinion 100 in such a manner that the idle gear 101 is meshed with both the gear 102 and the pinion 100.

Figure 4:
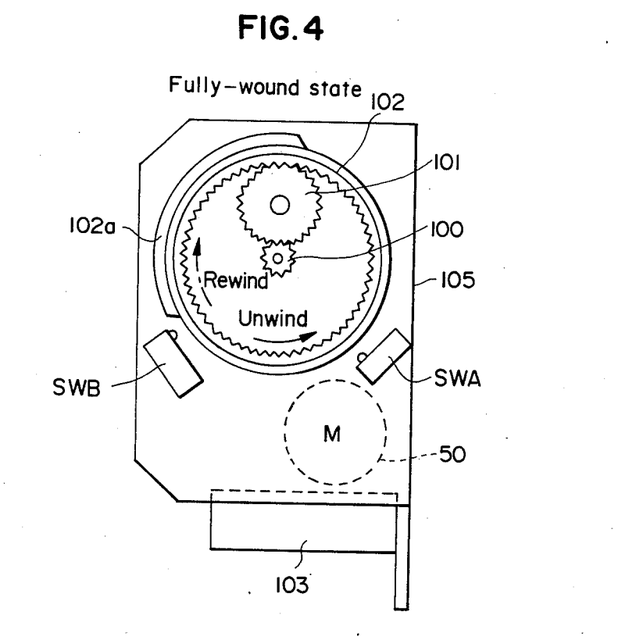
FIGS. 4 to 6 show in combination the positional relationship between the cam and the switches, which are shown in FIG. 1.
Figure 5:
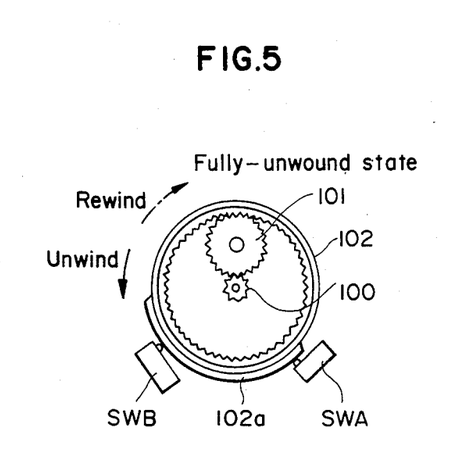
Figure 6:
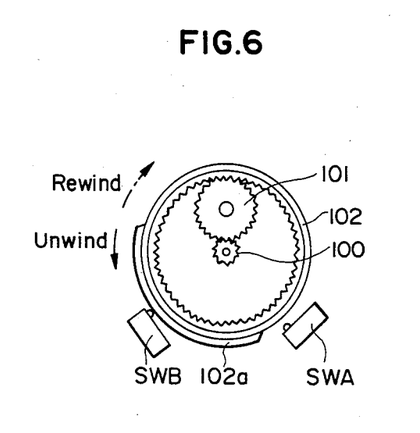
Figure 7:
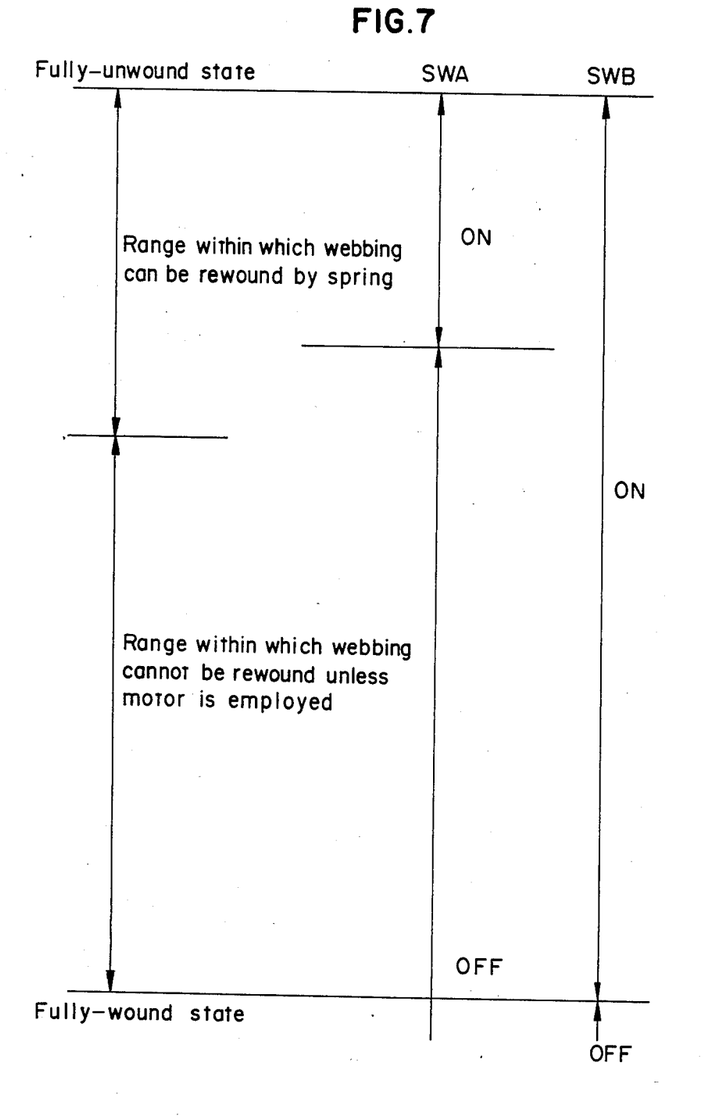
FIG. 7 is a chart showing the ON/OFF states of the switches.

Referring to FIG. 4, a circular cam 102a is rigidly secured to the outer periphery of the internally-toothed gear 102. Switches SWA and SWB are disposed on the outer surface of the lower casing 105, the switches SWA and SWB being a predetermined distance spaced apart from each other along the circumference of the gear 102 so that they are turned on/off by the action of the cam 102a. The positional relationship between the cam 102a and the switches SWA, SWB is so set that, when the webbing 24 is unwound and fastened to the occupant's body (i.e., a fully-unwound state), both the switches SWA and SWB are turned on as shown in FIGS. 5 and 7, whereas, when a predetermined amount of webbing 24 is rewound by the action of the spiral spring 30, the switch SWA is turned off and the switch SWB is turned on as shown in FIGS. 6 and 7, and when the webbing 24 is fully wound up oh the take-up shaft 22 (i.e., a fully-wound state), both the switches SWA and SWB are turned off as shown in FIGS. 4 and 7.

Figure 8:
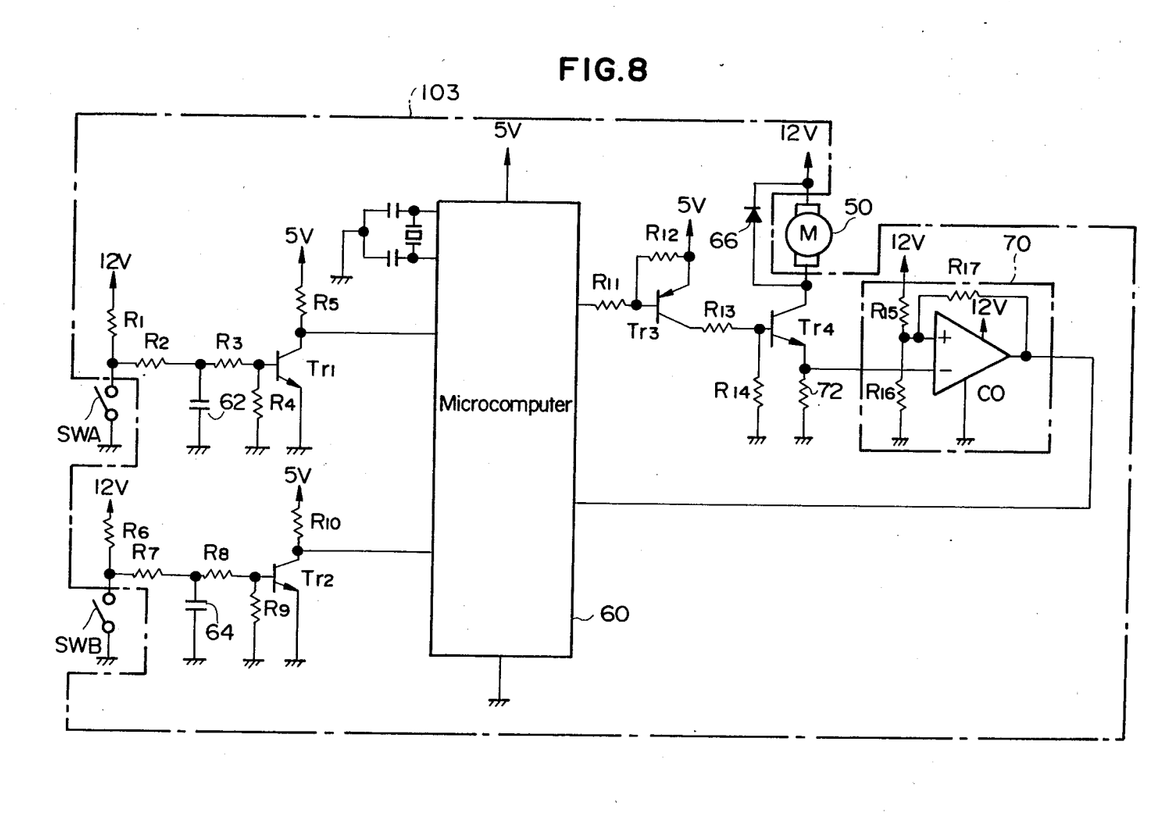
FIG. 8 is a circuit diagram showing the details of the control circuit in accordance with the embodiment of the present invention.

The motor 50 is connected to a control circuit 103 which is secured to the frame 12, as shown in FIGS. 1 and 8. The switches SWA and SWB are connected to the control circuit 103 as shown in FIG. 8.

Referring to FIG. 8, the control circuit 103 consists of a microcomputer 60, resistors R1 to R14, a resistor 72, transistors Tr1 to Tr4, capacitors 62, 64, a diode 66, and a motor lock detecting circuit 70. The circuit 70 detects a state wherein, although the motor 50 is energized, the motor 50 is locked from rotating to wind up the webbing 24, and, is composed of resistors R15 to R17 and a comparator CO. It should be noted that the capacitors 62 and 64 are provided for the purpose of removing any chattering, and the diode 66 functions as a surge killer.

In the control circuit 103, when the switch SWA is turned on, the transistor Tr1 is turned off. In consequence, a high-level signal is input to the microcomputer 60. A high-level signal is also input to the microcomputer 60 when the switch SWB is turned on.

When a low-level signal is output from the microcomputer 60, the transistors Tr3 and Tr4 are turned on. In consequence, a voltage is applied to the motor 50 from a battery mounted on the vehicle so as to activate the motor 50 to rotate. The motor lock detecting circuit 70 is arranged such that the voltage E across the resistor 72 which is generated in accordance with the current flowing through the motor 50 is compared with a reference voltage $E_0$ by means of the comparator CO, and when the condition of $E<E_0$ holds, the circuit 72 outputs an ON signal to the microcomputer 60. When the motor 50 is energized and rotated without being locked, the condition of $E<E_0$ is satisfied, whereas, when the motor 50 is locked from rotating, the impedance of the motor 50 decreases to increase the current flowing through the motor 50, so that the condition of $E>E_0$ holds.

Figure 9A:
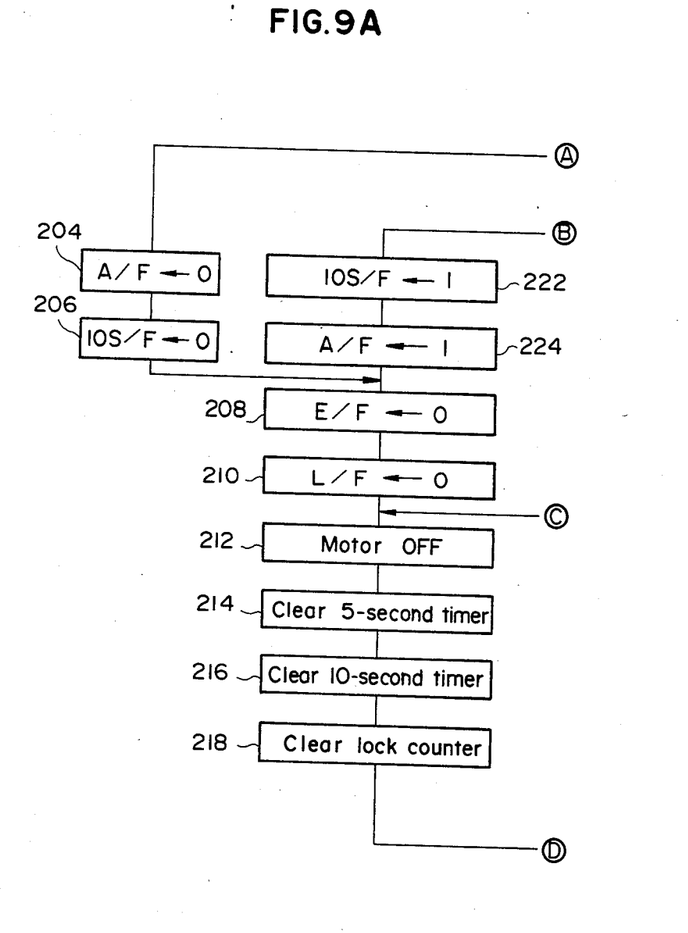
FIGS. 9A, 9B and 9C are flow charts showing a motor control routine in accordance with the embodiment of the present invention.
Figure 9B:
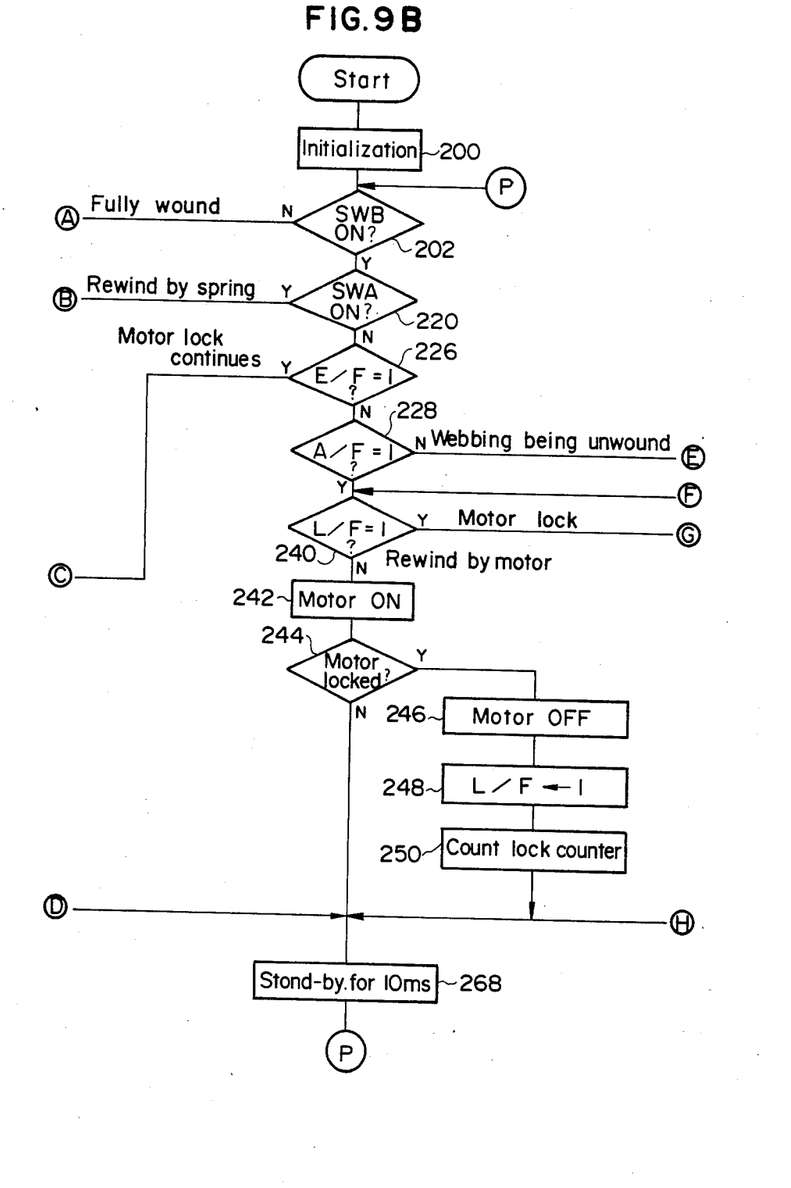
Figure 9C:
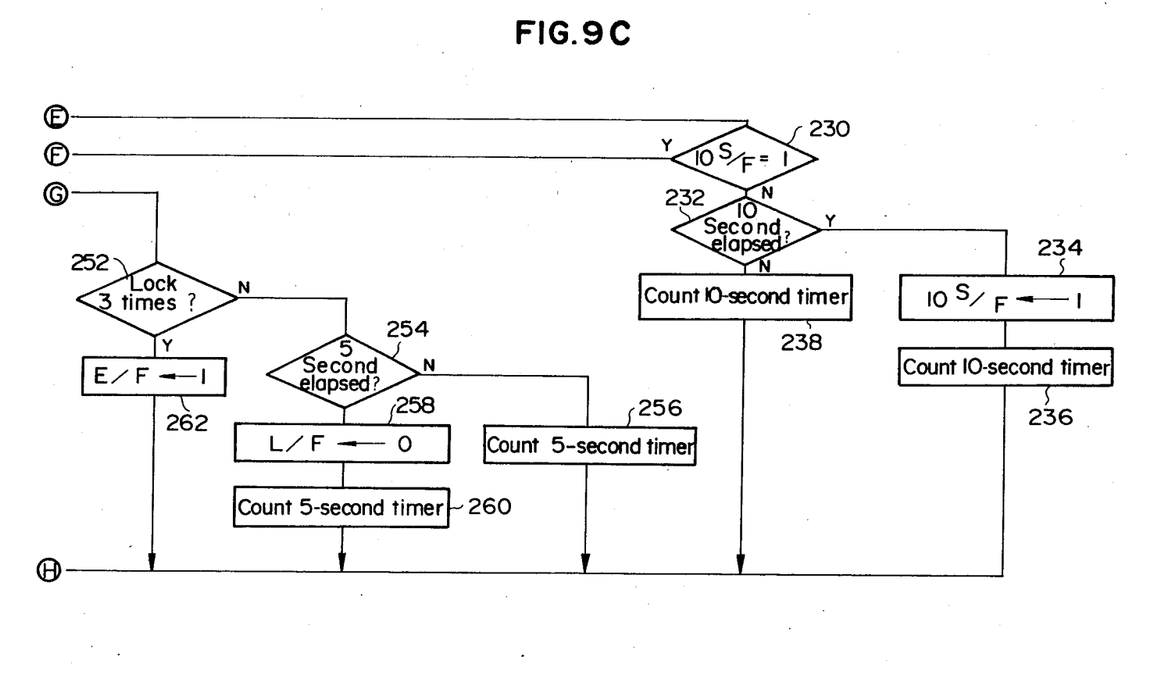

The motor control routine executed by the microcomputer 60 will be described below with reference to FIG. 9. Control steps will be successively explained below by way of one example in which the webbing 24 which has fully been wound up on the take-up shaft 22 is unwound so as to be fastened to the occupant's body, and the webbing 24 is unfastened and rewound on the take-up shaft 22.

When the ignition switch is turned on, the microcomputer 60 starts to operate. Initialization is executed in Step 200, and a judgement or decision is made in Step 202 as to whether or not the switch SWB is ON. When the webbing 24 is in a fully-wound state, the switch SWB is OFF. The process therefore proceeds to Steps 204 to 210, in which an SWA flag A/F, a 10-second stand-by flag 10S/F, a lock control end flag E/F and a motor lock flag L/F are reset, respectively. Thereafter, the motor 50 is turned off in Step 212, and a 5-second timer, a 10-second timer, a lock counter are cleared in Steps 214 to 218, respectively. Then, the control process stands by for 10 msec in Step 268. Accordingly, when the webbing 24 is in a fully-wound state, the motor 50 is not activated.

When the webbing 24 is unwound, the switch SWB is ON. In consequence, the process proceeds from Step 202 to Step 220, in which a decision is made as to whether or not the switch SWA is ON. In the early stage of the webbing unwinding operation, the switch SWA is OFF, and the motor 50 is not activated; therefore, the lock control end flag E/F is reset. In addition, since the switch SWA has not been turned on, the SWA flag A/F is reset. In consequence, the process proceeds from Step 220 to Step 226 and further proceeds through Step 228 to Step 230, in which a decision is made as to whether or not the 10-second stand-by flag 10S/F has been set. Since the 10-second stand-by flag 10S/F has been reset in Step 206, the process proceeds from Step 230 to Step 232, in which a judgement is made as to whether or not 10 seconds has elapsed on the basis of the 10-second timer which is counted every 10 msec. in Step 238 and which is cleared in Step 236. If NO is the answer in Step 232, the 10-second timer is incremented by one in Step 238, and the process then proceeds to Step 268. If YES is the answer in Step 232, the 10-second stand-by flag 10S/F is set in Step 234, and the 10-second timer is cleared in Step 236, and then the process proceeds to Step 268.

When the 10-second stand-by flag is judged to be set in Step 230, a judgement is made in Step 240 as to whether or not the motor lock flag L/F has been set. Since the motor 50 has not yet been activated and any lock of the motor 50 has not occurred in the control which has been executed so far, the process proceeds from Step 240 to Step 242, in which the motor 50 is turned on. In consequence, the spur gear 36 is rotated clockwise as viewed in FIG. 3 through the spur gears 52 and 48, causing centrifugal force to act on the lock piece 38, so that the lock teeth 42 are meshed with the ratchet teeth 44 against the biasing force from the coil spring 46, thus bringing the centrifugal clutch 33 into an engaged state. Accordingly, the internally-toothed ratchet wheel 34 rotates together with the spur gear 36 in one unit, thus causing the take-up shaft 32 to rotate in the direction in which the webbing 24 is wound up. In this way, the torque derived from the motor 50 is added to the relatively weak biasing force from the spiral spring 30 to rewind the webbing 24.

Consequently, when the occupant unwinds the webbing 24 but does not fasten it before 10 seconds has elapsed, it is judged that the occupant will not fasten the webbing 24, and the webbing 24 is then rewound by means of the driving force from the motor 50.

After the motor 50 has been turned on in Step 242, a judgement is made in Step 244 as to whether or not the motor 50 is locked on the basis of the output of the motor lock detecting circuit 70. If NO, the process proceeds to Step 68. If YES is the answer, the motor 50 is turned off in Step 246, and after the motor lock flag L/F has been set in Step 248, the motor lock counter is incremented by one in Step 250, and then the process proceeds to Step 268.

When the webbing 24 has been unwound to a length with which the occupant's body can be fastened, the switch SWA is turned on. Accordingly, the process proceeds from Step 202 to Steps 222 and 224 through Step 220. In Step 222, the 10-second stand-by flag 10S/F is set, and in Step 224, the SWA flag A/F is set. Then, Steps 208 to 268 are executed. Thus, when the webbing 24 is unwound to a length with which the occupant's body can be fastened, if the tongue plate is engaged with the buckle device, there is no possibility that the webbing 24 may be rewound by the driving force from the motor 50. When the occupant has the webbing 24 fastened, the webbing 24 is tensed by only the relatively weak biasing force from the spiral spring 30, and therefore the occupant feels no pressure from the webbing 24. In addition, the occupant having the webbing 24 fastened can change his posture with ease.

When the occupant disengages the tongue plate from the buckle device in order to unfasten the webbing 24, the webbing 24 is rewound by means of the relatively weak biasing force from the spiral spring 30 in the early stage of the webbing wind-up operation, and when a predetermined amount of webbing 24 has been rewound, the switch SWA is turned off. It should be noted that the switch SWB has already been turned on at that time. In consequence, the process proceeds from Step 202 to Step 220 and further to Step 228 through Step 226, and a judgement is made in Step 228 as to whether or not the SWA flag A/F has been set. The flag A/F is set in Step 224 when the webbing 24 is fastened to the occupant's body. Therefore, the process proceeds from Step 228 to Step 242 through Step 240, and the motor 50 is turned on in Step 242, so that the webbing 24 is rewound by means of the driving force from the motor 50. When the webbing 24 has been fully rewound, the switch SWB is turned off. In consequence, the process proceeds from Step 202 to Steps 204 to 210, and the operation of the motor 50 is suspended in Step 212.

Accordingly, in the early stage of the webbing wind-up operation executed after the webbing 24 has been unfastened, the webbing 24 is rewound by means of the relatively weak biasing force from the spiral spring 30, and when the trailing end of the webbing 24 being rewound reaches a position which is sufficiently separate apart from the occupant's body, the webbing 24 is started to be rewound by means of the driving force from the motor 50. When the webbing 24 has fully been rewound, the operation of the motor 50 is suspended.

On the other hand, when the motor 50 is locked by any external force which acts on the webbing 24 while it is being rewound by the operation of the motor 50, the motor 50 is judged to be locked in Step 244, and the motor 50 is turned off in Step 246. In addition, the motor lock flag L/F is set in Step 248, and the motor lock counter is incremented by one in Step 250. Since the flag L/F is set in Step 248, the process proceeds from Step 240 to Step 252, in which a judgement is made as to whether or not the count of the motor lock counter is 3. If NO, a judgement is made in Step 254 as to whether or not 5 seconds has elapsed. If NO, the 5-second timer is incremented by one in Step 256. If YES is the answer in Step 254, the motor lock flag L/F is reset in Step 258, and the 5-second timer is cleared in Step 260. Then, the process proceeds to Step 268. Accordingly, after 10msec.. has elapsed, the process proceeds from Step 240 to Step 242, in which the motor 50 is turned on, and a judgement is made again in Step 244 as to whether or not the motor 50 is locked.

When the motor 50 which has been locked is released, the motor 50 is turned on and activated until the webbing 24 is fully rewound. However, when the motor 50 is not released from the locked state, the above-described control is repeated three times, and if locking of the motor 50 is detected three times (when the motor 50 is continuously locked for about 15 seconds), the process proceeds from Step 252 to Step 262, in which the lock control end flag E/F is set. In consequence, the process proceeds from Step 226 to Step 212, in which the motor 50 is turned off, and the motor 50 is thereby prevented from having a failure such as seizing.

As has been described above, according to this embodiment, the webbing take-up shaft is biased so as to rotate in the direction in which the webbing is wound up by means of a relatively weak force from a spiral spring so that there is no slack in the webbing. It is therefore possible for the occupant to unwind and fasten the webbing with ease. In addition, when the occupant has the webbing fastened, he feels no pressure from the webbing. Since it is unnecessary to provide a webbing tension detector in order to control the webbing tension, the structure of the webbing retractor is simplified.

The rotational force from the motor is transmitted to the webbing take-up shaft through a clutch. Therefore, when the occupant has the webbing fastened, there is no risk of the drag torque caused by the motor being transmitted to the take-up shaft, so that there is no fear of the webbing tension becoming unnecessarily large. It suffices to turn on the motor only when the webbing is unfastened, which means that the control operation is simplified, and the rate of power consumpion is lowered, advantageously. Since the control circuit and the two switches are accommodated within the webbing retractor and the distance between the control circuit and the switches is reduced, the required wiring harness is shorter than that in the case where a buckle switch is provided within the buckle device. Further, since the wiring harness can be accommodated within the webbing retractor, it becomes easy to handle the wiring harness, so that the webbing retractor is readily and effectively mounted on a vehicle. In addition, there is no fear of any electrical noise entering the wiring harness.

What is claimed is:

1. A webbing retractor for use in a seatbelt system for a vehicle designed to protect an occupant in an emergency vehicular situation, comprising:
   (a) a take-up shaft for winding up a webbing;
   (b) driving means for applying a relatively strong wind-up force on the take-up shaft;
   (c) biasing means for applying a relatively weak wind-up force on the take-up shaft until said driving means is actuated;
   (d) detecting means including sensors disposed at least two positions, respectively for detecting whether or not a predetermined amount of said webbing unfastened form the occupant's body has been wound up on said take-up shaft; and
   (e) control means including means for actuating said driving means operatively connected to said take-up shaft, and adapted to activate said driving means only when said detecting means senses that a predetermined amount of said webbing has been wound up on said take-up shaft, so that said webbing is initially wound up by means of a relatively weak biasing force in the webbing wind-up operation carried out after the occupant has unfastened said webbing, and said webbing is finally wound up by means of a relatively strong biasing force after said initial wind-up is concluded.

2. A webbing retractor according to claim 1, wherein each of said sensors is constituted by a limit switch.

3. A webbing retractor according to claim 1, wherein both said detecting means and said control means are disposed within a retractor accommodating casing.

4. A webbing retractor according to claim 1, further comprising a clutch for transmitting driving force to said take-up shaft when said driving means is activated.

5. A webbing retractor according to claim 1, wherein said control means decides that a predetermined amount of said webbing has been rewound onto said take-up shaft when, among said sensors, a predetermined number of sensors are ON and a predetermined number of sensors are OFF after the occupant has unfastened said webbing.

6. A webbing retractor according to claim 1, wherein said control means decides that the occupant will not fasten said webbing when said webbing is not unwound to a predetermined length within a predetermined period of time after he has begun to unwind said webbing, and said control means then activates said driving means to rewind the whole of the unwound webbing.

7. A webbing retractor according to claim 1, wherein said control means activates said driving means when, after all the sensors, defining said detecting means, have detected the fact that said webbing has been unwound, at least one of these sensors no longer detects said webbing being unwound.

8. A webbing retractor according to claim 1, wherein said control means suspends the operation of a motor which defines said driving means after said motor has been locked.

9. A webbing retractor according to claim 1, wherein said control means decides a motor which defines said driving means to be locked when said motor is locked and a predetermined period of time has elapsed thereafter, and if said motor is still locked after this decision has been executed a predetermined number of times, said control means suspends the operation of said motor to prevent it from seizing.

10. A webbing retractor for winding up on a take-up shaft a webbing which is fastened over the body of an occupant when said occupant drives a vehicle, comprising:
 (a) a motor for subjecting said take-up shaft to a relatively strong biasing force and completely winding up said webbing when actuated;
 (b) a spiral spring for constantly subjecting said take-up shaft to a relatively weak biasing force and partially winding up said webbing until said motor is activated;
 (c) a clutch interposed between said motor and said take-up shaft to transmit a driving force from said motor to said take-up shaft when said motor is activated; and
 (d) control means that decides that the occupant has said webbing fastened when it detects both a first unwound state wherein the amount by which said webbing is unwound from said take-up shaft is relatively small and a second unwound state wherein said amount is larger than that associated with said first unwound state, including means for actuating said motor operatively connected to said take-up shaft, and adapted to activate said motor only when a predetermined amount of said webbing has been rewound by means of the biasing force from said spiral spring after the occupant has unfastened said webbing, so that the balance of the unwound webbing is rewound by means of the relatively strong wind-up force from said motor after said webbing has been unfastened.

11. A webbing retractor according to claim 10, wherein said control means activates said motor when said first unwound state is detected after it has been decided that the occupant will net fasten said webbing.

12. A webbing retractor according to claim 10, wherein the operation of said motor is suspended when a state wherein, although it is energized, said motor is locked from rotating is detected a plurality of times.

13. A webbing retractor according to claim 10, wherein said control means activates said motor to rewind the whole of the unwound webbing when said second unwound state is not detected even when a predetermined period of time has elapsed after said first unwound state has been detected during an occupant's webbing fastening operation.

14. A webbing retractor according to claim 11, wherein said control means suspends the operation of said motor when said webbing is rewound onto said take-up shaft to said first unwound state.

15. A webbing retractor for use in a vehicle, comprising:
 (a) a frame secured to a vehicle body;
 (b) a take-up shaft rotatably supported by said frame;
 (c) an occupant restraining webbing secured at one end thereof to said take-up shaft;
 (d) a spiral spring interposed between said frame and said take-up shaft to rotate said take-up shaft with a relatively weak biasing force;
 (e) a motor for rotating said take-up shaft so as to wind up said webbing;
 (f) a clutch for transmitting rotational force to said take-up shaft when said motor is activated to rotate;
 (g) a casing secured to said frame for covering said spiral spring, said clutch and said motor;
 (h) first detecting means for detecting a first state wherein the amount by which said webbing is unwound from said take-up shaft reaches a predetermined value;
 (i) second detecting means for detecting a second state wherein the amount by which said webbing is unwound from said take-up shaft is greater than said predetermined value; and
 (j) control means adapted to activate said motor when, after said second state has been detected by said second detecting means, said webbing is rewound to such an extent that said second state is no longer detected by said second detecting means but said first state is still detected by said first detecting means.

16. A webbing retractor according to claim 15, wherein said control means activates said motor to rewind said webbing when said second state is not detected by said second detecting means even when a predetermined period of time has elapsed after said first state has been detected by said first detecting means during a webbing unwinding operation.

17. A webbing retractor according to claim 15, wherein, when said first state is not detected by said first detecting means despite that said motor is energized, said control means energizes said motor a predetermined number of times, and when said motor is judged to be continuously locked, said control means suspends the operation of said motor.

18. A webbing retractor according to claim 15, wherein said control means suspends the operation of said motor when said first state is detected by said first detecting means during a webbing rewinding operation.

19. A webbing retractor for use in a seatbelt system designed to fasten around and protect an occupant in an emergency vehicular situation, comprising:
 (a) a take-up shaft for winding up a webbing;
 (b) a selectively actuatable driving means for applying a relatively strong wind-up force on the take-up shaft when actuated;
 (c) a biasing means for applying a relatively constant and weak wind-up force on the take-up shaft which is capable of partially rewinding said webbing a predetermined amount when said webbing is extended;
 (d) detecting means including sensors disposed at least two positions, respectively for detecting whether or not said predetermined amount of webbing has been wound up on said take-up shaft after said, webbing has been unfastened from around the occupant's body, and
 (e) control means operatively connected to said driving means and said detecting means for actuating the driving means only after said predetermined amount of webbing has been wound up on said take-up shaft by the relatively weak biasing force applied by said biasing means, so that only a weak biasing force is applied to said webbing, when said webbing is extended around the occupant's body and when said webbing is initially wound up.

* * * * *